US008057703B2

(12) United States Patent
Naum et al.

(10) Patent No.: US 8,057,703 B2
(45) Date of Patent: Nov. 15, 2011

(54) THREE-BAND PHOSPHOR FOR MULTI-LAYER AGRICULTURAL PLASTIC FILM

(75) Inventors: Soshchin Naum, Changhua (TW); Wei-Hung Lo, Taipei (TW); Chi-Ruei Tsai, Taipei (TW)

(73) Assignee: Wei-Hung Lo, Taipei (TW)

( * ) Notice: Subject to any disclaimer, the term of this patent is extended or adjusted under 35 U.S.C. 154(b) by 564 days.

(21) Appl. No.: 12/241,594

(22) Filed: Sep. 30, 2008

(65) Prior Publication Data
US 2009/0152494 A1 Jun. 18, 2009

(30) Foreign Application Priority Data

Dec. 12, 2007 (TW) .............................. 96147538 A

(51) Int. Cl.
C09K 11/59 (2006.01)
C09K 11/55 (2006.01)
(52) U.S. Cl. ................................. 252/301.4 F
(58) Field of Classification Search ............. 252/301.4 F
See application file for complete search history.

(56) References Cited

U.S. PATENT DOCUMENTS

| 6,939,481 B2 * | 9/2005 | Srivastava et al. ..... 252/301.4 R |
| 6,982,045 B2 * | 1/2006 | Menkara et al. ........ 252/301.4 F |
| 7,023,019 B2 * | 4/2006 | Maeda et al. .................... 257/89 |
| 7,026,755 B2 * | 4/2006 | Setlur et al. ..................... 313/501 |
| 7,468,147 B2 * | 12/2008 | Shida et al. .............. 252/301.4 F |
| 7,618,557 B2 * | 11/2009 | Daicho et al. ............ 252/301.4 F |
| 7,635,438 B2 * | 12/2009 | Tamatani et al. ........ 252/301.4 F |
| 2007/0170840 A1 * | 7/2007 | Chang-Hae et al. ........... 313/503 |
| 2009/0315448 A1 * | 12/2009 | Kuze et al. ..................... 313/503 |

FOREIGN PATENT DOCUMENTS

| WO | WO 2005/112135 | * | 11/2005 |
| WO | WO 2006/043747 | * | 4/2006 |

* cited by examiner

*Primary Examiner* — Carol M Koslow
(74) *Attorney, Agent, or Firm* — The Weintraub Group, P.L.C.

(57) ABSTRACT

A blue-green-red three-band phosphor for multilayer agricultural plastic film for converting near ultraviolet light in photosynthetic active radiation is disclosed. The substrate of the phosphor is prepared from the group IIA element $SiO_4^{4-}$, having a total stoichiometric equation $(\Sigma Me^{+2}O)_{2\alpha}(SiO_2)_\alpha$, in which $\alpha=1, 2, 3$, $\Sigma Me^{+2}=Ba^{+2}$ and/or $Sr^{+2}$ and/or $Ca^{+2}$ and/or $Mg^{+2}$, having an orthorhombic crystal architecture, and generating a three-band spectrum when activated by d-f element selected from the group of $Eu^{+2}$, $Mn^{+2}$ and $Sm^{+2}$. The maximum wavelength of the three-band spectrum is $\lambda_1=440\sim460$ nm, $\lambda_2=515\sim535$ nm and $\lambda_3=626\sim640$ nm. The maximum value and halfwave width of every spectrum are determined subject to the concentration of the activator and the phosphor synthesis technology. The three-band phosphor is prepared through a solid synthesis method in the form of high dispersed ultrafine powder having the average grain size of $d\leqq0.8$ μm. The use of an agricultural plastic film made according to the present invention in an enclosed soil equipment greatly raises the productivity of vegetable crop.

1 Claim, 4 Drawing Sheets

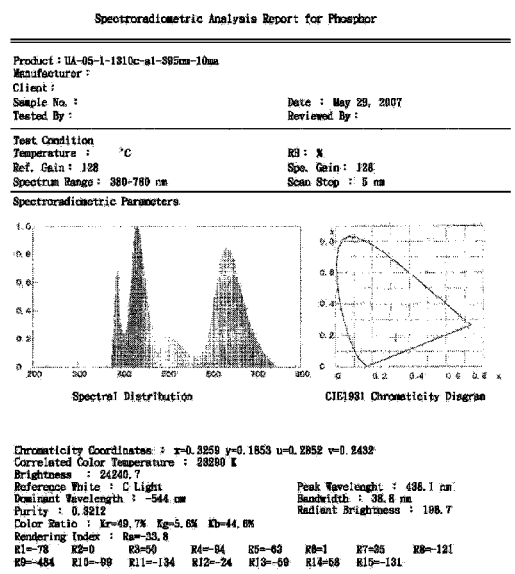

FIG. 1

Spectroradiometric Analysis Report for Phosphor

Product : UA-05-1-1310c-a1-395nm-10ma
Manufacturer :
Client :
Sample No. :                           Date : May 29, 2007
Tested By :                            Reviewed By :

Test Condition
Temperature :     °C                   RH : %
Ref. Gain : 128                        Spe. Gain : 128
Spectrum Range : 380-780 nm            Scan Step : 5 nm Spectroradiometric Parameters

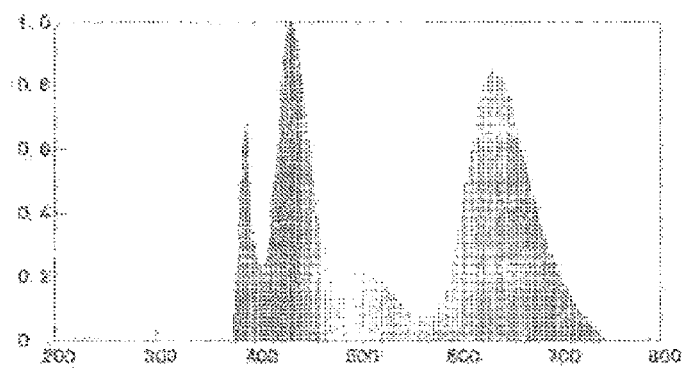

Spectral Distribution

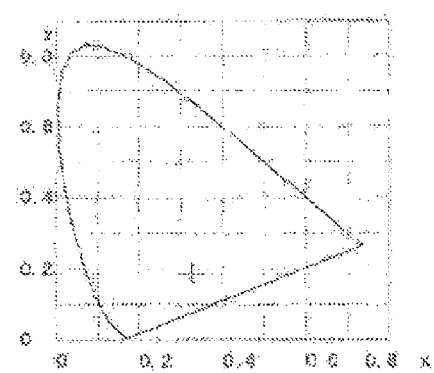

CIE1931 Chromaticity Diagram

Chromaticity Coordinates : x=0.3259 y=0.1853 u=0.2852 v=0.2432
Correlated Color Temperature : 23290 K
Brightness : 24240.7
Reference White : C Light                Peak Wavelenght : 438.1 nm
Dominant Wavelength : -544 nm            Bandwidth : 38.8 nm
Purity : 0.3212                          Radiant Brightness : 198.7
Color Ratio : Kr=49.7% Kg=5.6% Kb=44.6%
Rendering Index : Ra=-33.8
R1=-78    R2=0     R3=50    R4=-94   R5=-63   R6=1     R7=35    R8=-121
R9=-484   R10=-99  R11=-134 R12=-24  R13=-59  R14=58   R15=-131

SPR-920D  Analyzer System for Phosphor Spectroradiometric made by
Zhejiang University Sensing Instruments Co., Ltd.

FIG. 2

Spectroradiometric Analysis Report for Phosphor

Product : UV-022-al-1310-395m-10mm
Manufacturer :
Client :
Sample No. :                                    Date : April 14, 2007
Tested By :                                     Reviewed By :

Test Condition
Temperature :      °C                           RH : %
Ref. Gain : 128                                 Spc. Gain : 128
Spectrum Range : 380-780 nm                     Scan Step : 5 nm Spectroradiometric Parameters

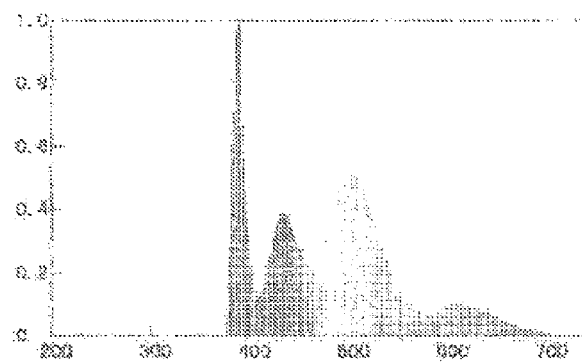
Spectral Distribution

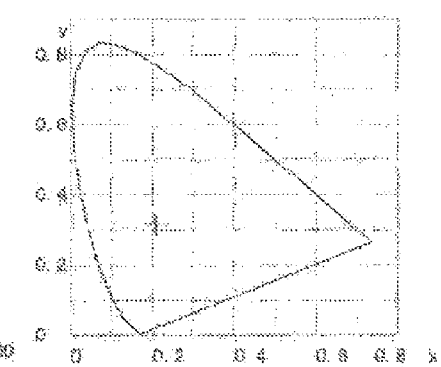
CIE1931 Chromaticity Diagram

Chromaticity Coordinates : x=0.2090 y=0.3159 u=0.1312 v=0.0974
Correlated Color Temperature : 17730 K
Brightness : 41608.6
 Reference White : C Light                      Peak Wavelenght : 392.8 nm
Dominant Wavelength : 490 nm                    Bandwidth : 12.5 nm
Purity : 0.3807                                 Radiant Brightness : 203.067
Color Ratio : Kr=10.5%  Kg=18.7%  Kb=70.7%
Rendering Index : Ra=72.8
R1=60      R2=69      R3=82      R4=70      R5=66      R6=63      R7=93      R8=79
R9=-4      R10=44     R11=55     R12=58     R13=55     R14=87     R15=63

SPR-920D Analyzer System for Phosphor Spectroradiometric made by Zhejiang University Sensing Instruments Co., Ltd.

FIG. 3

Spectroradiometric Analysis Report for Phosphor

Product : VA08-9-1350c-al-395nm-10ma
Manufacturer :
Client :
Sample No. :                                  Date : June 1, 2007
Tested By :                                   Reviewed By :

Test Condition
Temperature :   °C                            RH :  %
Ref. Gain : 128                               Spe. Gain : 16
Spectrum Range : 380-780 nm                   Scan Step : 5 nm Spectroradiometric Parameters

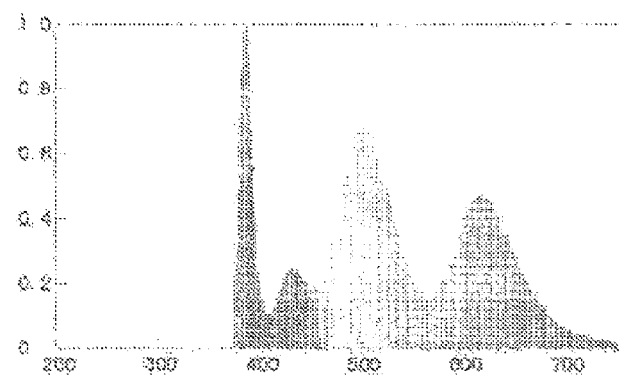

Spectral Distribution

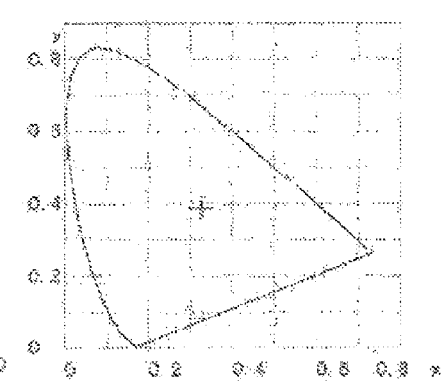

CIE1931 Chromaticity Diagram

Chromaticity Coordinates : x=0.3259 y=0.3884 u=0.186 v=0.3325
Correlated Color Temperature : 5734 K
Brightness : 29140.3
Reference White : C Light                     Peak Wavelenght : 392.7 nm
Dominant Wavelength : 560 nm                  Bandwidth : 12.7 nm
Purity : 0.2389                               Radiant Brightness : 123.88
Color Ratio : Kr=33.9%  Kg=18.3%  Kb=47.7%
Rendering Index : Ra=71.7
R1=69    R2=83    R3=77    R4=64    R5=73    R6=72    R7=75    R8=60
R9=8     R10=57   R11=56   R12=68   R13=72   R14=85   R15=73

SPR-920D Analyzer System for Phosphor Spectroradiometric made by Zhejiang University Sensing Instruments Co., Ltd.

FIG. 4

Spectroradiometric Analysis Report for Phosphor

Product : UA01-I-AL-1350c-395nm-10ma
Manufacturer :
Client :
Sample No. :                                        Date : May 28, 2007
Tested By :                                         Reviewed By :

Test Condition
Temperature :     °C                                RH : %
Ref. Gain : 64                                      Spc. Gain : 128
Spectrum Range : 380-780 nm                         Scan Step : 5 nm Spectroradiometric Parameters

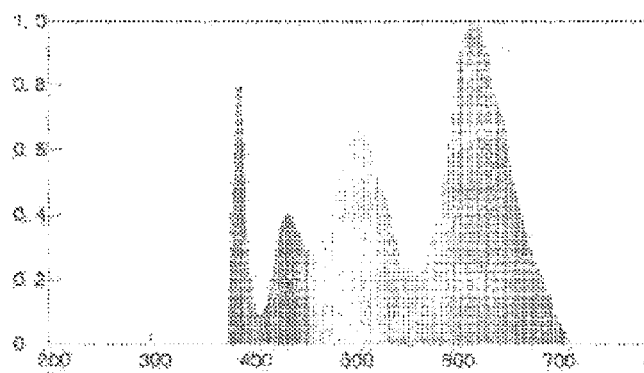

Spectral Distribution

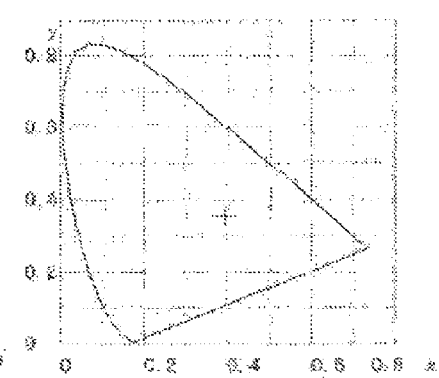

CIE1931 Chromaticity Diagram

Chromaticity Coordinates : x=0.3943 y=0.3547 u=0.2439 v=0.329
Correlated Color Temperature : 3436 K
Brightness : 33194.3
Reference White : C Light                           Peak Wavelenght : 624.8 nm
Dominant Wavelength : 583 nm                        Bandwidth : 71.0 nm
Purity : 0.3271                                     Radiant Brightness : 142.547
Color Ratio : Kr=49.3%  Kg=14.9%  Kb=35.8%
Rendering Index : Ra=58.8
R1=47     R2=66     R3=85     R4=41     R5=41     R6=44     R7=89     R8=57
R9=1      R10=20    R11=18    R12=13    R13=47    R14=91    R15=58

SPR-920D  Analyzer System for Phosphor Spectroradiometric made by
Zhejiang University Sensing Instruments Co., Ltd.

THREE-BAND PHOSPHOR FOR MULTI-LAYER AGRICULTURAL PLASTIC FILM

BACKGROUND OF THE INVENTION

1. Field of the Invention

The present invention relates to agricultural field and soil enclosure means for seasonal hot bed and greenhouse and more specifically, to the agricultural science and technology for creating optimal spectrum and sunlight illumination atmosphere for green plants under a seasonal thin-film covered hotbed condition.

2. Description of the Related Art

Since the foundation work of research by Russian natural scientist K. A. Timiriazev in 1896-1919, it has been for sure that sunlight is absorbed into the leaves of green plants by a green pigment, which absorbs red and blue light, but reflects green light, causing the leaves to appear green. This light energy is then converted into a chemical energy in the form of starch or sugar: $6CO_2+6H_2O \rightarrow C_6H_{12}O_6+6O_2$.

This equation translates as six molecules of water ($6H_2O$) plus six molecules of carbon dioxide ($6CO_2$) produce one molecule of sugar ($C_6H_{12}O_6$) plus six molecules of oxygen ($O_2$).

Since the creation of phosphor light source in 1930~1950, all greenhouses and hotbed provide red and blue radiation light sources. Under the illumination of radiation light sources, the amount of vegetables and fruits obtained from the enclosed soil equipment is greatly increased. Solar radiation goes through a polyethylene thin film and the pigment of the polyethylene thin film is modified to, for example, light blue or rose. In the years of 1980~1990, light conversion agricultural films were appeared. The radiation of these light conversion agricultural films include 5~6% red light. This red light reacts with 6% original solar ultraviolet radiation. These agricultural films were patented in many countries around the world, such as Russian Patent 2160289 (inventor Soschin. N et. al.), Russian Patent 2064482 (inventor Soschin. N et. al.), U.S. Pat. No. 6,153,665 (inventor Goldburt et. al.), Euro Patent 999/35595 (inventor Bolschukxin W. et. al.), and Mexico Patent MX 01004165A (inventor E. T. Boldburt et. al.). The invention adopts the aforesaid patents as reference objects. In the aforesaid patents, a first generation light conversion agricultural plastic film utilizes $Y_2O_2S$:Eu based narrowband red phosphor, which has best conversion efficiency as known. The half-wave width of the spectrum band is smaller than 5 nm, assuring enhancement of red quantum concentration on the surface of green plants. Under the effect of light conversion agricultural plastic films, the production of vegetables and fruits in hotbed is increased by 20~75%, and the nutrition composition of vegetables and fruits is substantially improved, for example, vitamin and minor element content of vegetables and fruits is increased.

Although the first generation light conversion agricultural plastic films have been intensively used for agricultural purposes, they still have drawbacks. At first, light conversion involves red spectrum region only, giving no effect on the second shortwave of blue spectrum. Under this condition, photosynthesis is periodically destroyed. Further, reduction of transmissive light in blue and green spectrum regions of the light conversion agricultural plastic films results in extended growth period of greenhouse crop. The creation of a thin film having blue-red re-radiation characteristic eliminates a part of the aforesaid drawbacks. US2000/24343 (inventor Soschin. N. et. al.) discloses a similar design. The invention utilizes this invention as a prototype. The blue and red phosphors filled in this agricultural plastic film create supplementary light for plants. Using blue and red conversion radiator means in a film layer is a continuation and development of this concept, and has become a patent of France researchers (see WO 00/24243, inventor Blanc. W. et. al.). They created a single-component dual-band phosphor based on $Ba_3MgSi_2O_8$:$Eu^{+2}Mn^{+2}$. With respect to the fabrication of agricultural plastic films, the concept of the aforesaid patent assures its advantages. However, in the literature, we did not find any strick proof of the applicability of this agricultural plastic film. The application of this dual-band phosphor may be constrained to its defect because photosynthesis requires all the three spectrum regions: blue, green and red at different radiation amounts.

Actually, according to data from modern researchers, spectrum illumination has the following physiological meanings: 1. 280~320 nm UVB light will damage plants; 2. Radiation of UVB and near UVB light at a small amount has a great concern with growth regulation of plants; 3. Purple and blue light are requisite for photosynthesis and regulation of upper green leaves (plant root system); 4. Green and yellow radiation provides a long-lasting effect, and is partially absorbed by lush green leaves and dense tender branches of plants; 5. Orange and red radiation is necessary for photosynthesis; 6. 700~750 nm dark red radiation is the message communication path for green plants; and 8. 1200~1600 nm infrared radiation heats and dissolves plant nutrients. From this short catalog, we obtain the conclusion that full-spectrum illumination in radiation is necessary.

SUMMARY OF THE INVENTION

The present invention has been accomplished under the circumstances in view. It is the main object of the present invention to provide a three-band phosphor, which is practical for making a thin film light conversion material having the main spectrum at blue, green and red regions.

It is another object of the present invention to provide a three-band phosphor for multilayer agricultural plastic film, which is practical for making a material that exists in the form of an inorganic phosphor for radiation conversion in blue, green and red spectral regions subject to predetermined strength ratio.

To achieve these and other objects of the present invention, the three-band phosphor is based on the substrate of the group IIA element $SiO_4^{4-}$ and activated by d-f element, characterized in that the three-band phosphor for pertains to $(MeO)_{2\alpha}(SiO_2)_\alpha$ silicate series, in which $\alpha=1,2,3$, $EMe^{+2}=Ba^{+2}$ and/or $Sr^{+2}$ and/or $Ca^{+2}$ and/or $Mg^{+2}$, having an orthorhombic crystal architecture, and generating a three-band spectrum when activated by d-f element.

BRIEF DESCRIPTION OF THE DRAWINGS

FIG. 1 is a radiation spectrum of phosphors prepared according to a first embodiment of the present invention;

FIG. 2 is a radiation spectrum of phosphors prepared according to a second embodiment of the present invention;

FIG. 3 is a radiation spectrum of phosphors prepared according to a third embodiment of the present invention; and FIG. 4 is a radiation spectrum of phosphors prepared according to a fourth embodiment of the present invention.

DETAILED DESCRIPTION OF THE PREFERRED EMBODIMENT

At first, the object of the present invention is to eliminate the drawbacks of the aforesaid conventional agricultural plastic film. A three-band phosphor in accordance with the present invention comprises a silicate-based substrate prepared from a group IIA element and activated by d-f element, characterized in that the three-band phosphor for pertains to $(MeO)_{2\alpha}(SiO_2)_\alpha$ silicate series, in which $\alpha=1,2,3, EMe^{+2}= Ba^{+2}$ and/or $Sr^{+2}$ and/or $Ca^{+2}$ and/or $Mg^{+2}$, having an orthorhombic crystal architecture, and generating a three-band spectrum when activated by d-f element;

wherein the d-f element can be $Eu^{+2}$, $Mn^{+2}$ or $Sm^{+2}$;

wherein the maximum wavelength of the three-band spectrum is $\lambda_1=440~460$ nm, $\lambda_2=515~535$ nm and $\lambda_3=625~650$ nm;

wherein when $\alpha=1$, the three-band phosphor has the stoichiometric equation of $(Ba_{1.0}Sr_{0.30}Ca_{0.30}Mg_{0.4})SiO_4$, the activator of $Eu^{+2}$, $Mn^{+2}$ and $Sm^{+2}$ at the concentration of $0.001<Eu\leq0.02$, $0.0001<Sm\leq0.005$, $0.001<Mn\leq0.015$, and orthorhombic crystal lattice structure capable of causing blue-green-red radiation in which the band relative intensity ratio is $1:0.5:1~1:0.25:0.5$;

wherein, when $\alpha=2$, the three-band phosphor has the stoichiometric equation of $(Ba_{0.5}Sr_{1.50}Ca_{1.0}Mg_{1.0})Si_2O_8$: EuSmMn, an orthorhombic crystal lattice structure, activator atomic fraction: $0.001\leq Eu\leq0.01$, $0.0001\leq Sm\leq0.005$ and $0.005\leq Mn\leq0.15$, capable of having the three-band visible spectrum be within the blue-green-red zone when band strength ratio is $1:2:2~1:2:4$;

wherein, when $\alpha=2$, the three-band phosphor has the stoichiometric equation of $Ba_{0.25}Mg_1Sr_{1.75}Ca_1Si_2O_8$, activator $Eu^{+2}$, $Mn^{+2}$ and $Sm^{+2}$, three-band visible spectrum in blue, green and red zones, and the band strength ratio of the three-band phosphor is $2:2:3$ when activated by near ultraviolet light;

wherein the three-band phosphor is an ultrafine grinding powder of average powder grain size $0.4\leq d_{cp}\leq0.8$ μm and variation range of specific surface $46\cdot10^3\leq S\leq80\cdot10^3$ cm$^2$;

wherein the three-band phosphor is an ultrafine grinding powder covered with lightproof pores of pore radius $12 Å\leq\tau\leq20 Å$, showing a ratio relationship between the powder surface and the pore surface of $10:1~10:2$.

The physical-chemical material properties of the three-band phosphor will be outlined hereinafter.

At the first place, these inorganic materials are linked by one single chemical formula. When the stoichiometric index $\alpha=1$, the formula of this three-band phosphor is recorded as $Me^{+2}{}_2Si_1O_4$. When the stoichiometric index $\alpha=2$, the formula of this three-band phosphor is recorded as $Me^{+2}{}_4Si_2O_8$. When the stoichiometric index $\alpha=3$, the formula of this three-band phosphor is recorded as $Me^{+2}{}_6Si_3O_{12}$. At the second place, the composite provided by the present invention exits only in one type of atom, for example, $Ba_2SiO_4$ or $Ba_4Si_2O_8$. When cation content (atomic fraction) in crystal lattice is equal, the chemical formula of the composite provided according to the invention can be recorded as $BaMgSiO_4$ or $(Ba,Mg,Sr,Ca)_4Si_2O_8$. At the third place, the composite crystal of the present invention has mainly an orthorhombic crystal lattice structure in which the number of molecules per unit cell $Z=4$.

As stated in our research, the aforesaid composite can easily be activated by metallic ions, such as $Sm^{+2}$ (d-f element), $Eu^{+2}$ (d-f element) and $Mn^{+2}$ (d element), forming a stable solid solution. Under this activation effect, the phosphor emit light. When excited by shortwave light, it produces three (two is rare) emission bands, at blue, green and red radiation zones. At this time, the luminescent center of blue color is $(Eu^{+2}{}_{Me+2})$, the luminescent center of red color is $(Mn^{+2}{}_{Me+2})$, and the accurate record of the luminescent center of green color is unknown but the imaginated ideal luminescent center can be $(Mg_{Ba})°$ or $(Sr_{Ba})°$ or $(Ca_{Ba})°$. Small size IIA group cation $Ba^{+2}$ is formed in the composite crystal lattice during same valence isomorphous substitution.

FIGS. 1-4 introduce radiation spectrum of phosphors prepared according to different embodiment of the present invention. In the spectrum shown in FIG. 1, first and second maximum values are obviously shown at $\lambda=450$ nm and $\lambda=520$ nm. A third maximum value appears at $\lambda=626$ nm but not so obvious. It is to be understood that the introduced spectra have concern with the composites $(Ba_{0.5}Sr_{0.15}Ca_{0.15}Mg_{0.2})_2SiO_4$:EuSmMn (see FIG. 1), $(Ba_{0.8}Sr_{2.2}Ca_{0.5}Mg_{0.5})Si_2O_8$:EuSmMn (see FIG. 2) and $(Ba_{0.4}Sr_{4.6}Ca_{0.5}Mg_{0.5})Si_3O_{12}$:EuSmMn (see FIG. 3). Actually, they do not show any regular relationship relative to spectrum of the one pack phosphor $Ba_3MgSi_2O_8$:EuMnPr. First, all the spectra have three maximum values but not two as indicated in the prototype module of the patent. Second, all the spectra have different maximum strengths (in FIGS. 1 & 2, the shortwave is higher; in FIG. 3, the medium wave is higher; FIG. 4, the long wave is higher). Further, the half-wave width of every radiation varies with the composition of the phosphor, for example, $\lambda_{0.5}=60~90$ nm. A phosphor prepared according to the present invention has the important features of high quantum efficiency and high luminescence intensity.

A phosphor prepared according to the present invention has a high energy brightness value about $60\cdot10^3~120\cdot10^3$ energy units (as a comparison standard, phosphor sample $Ba_{1.96}Eu_{0.04}SiO_4$ has the energy brightness of $L=80\cdot10^3$ energy units). Realization of a phosphor having the outstanding features according to the present invention is subject to the following conditions. The material has the stoichiometric formula $(Ba_{1.0}Sr_{0.30}Ca_{0.30}Mg_{0.4})SiO_4$, activators $Eu^{+2}$, $Sm^{+2}$ and $Mn^{+2}$ at concentration $0.001<Eu^{+2}\leq0.02$, $0.0001< Sm^{+2}\leq0.005$, $0.001<Mn^{+2}\leq0.015$. The composite has a orthorhombic crystal lattice architecture, assuring blue-green-red radiation. The band strength ratio is $1:0.5:1~1:0.25:0.5$. We see the phosphor has the maximum energy efficiency of radiation of $L\geq100\cdot10^3$. This kind of radiant body is requisite for greenhouse equipment in culturing protein-rich crops such as soy bean and green pea.

Hereinafter, we explain the effect of each kind of cations in the radiation of a three-band phosphor prepared according to the present invention. At first, $Ba^{+2}$ enhances the lattice parameter of $SiO_4^{4-}$, allowing accommodation of relatively bigger size of $Eu^{+2}$ ($Eu^{+2}$ ionic radius $\tau_{Eu}=1.24$ A that is the largest in these cations). When compared with $Ba^{+2}$, $Mg^{+2}$ has the smallest ionic radius ($\tau_{Mg}=0.65$ A), assuring high static gradient in the crystal lattice. This has a great concern with the characteristics of $Mg^{+2}$ that carries 2 units of charge and has a mall size. Further, $Sr^{+2}$ and $Ca^{+2}$ must be provided in the composition due to the following reasons: 1. In order to reduce the molecule mass of the stoichiometric equation of the phosphor provided according to the present invention, i.e., in order to reduce material consumption of the phosphor composition; 2. In order to form the geometric size of the non-equivalent weight luminescence center, the middle green radiation band must be extended as long as possible. Therefore, $Sr^{+2}$ is added to the crystal lattice to assure formation of the center of $(Sr^{+2}{}_{Ba+2})$, more particular when $(Sm^{+2}{}_{Ba+2})°$ exists, it assures green-yellow luminance. This effect is produced by the isomorphic substitution of $Ca^{+2}$ in the $SiO_4^{4-}$; 3. In order to form a uniform internal crystal medium, inducing a regulator effects between big size $Ba^{+2}$ and small size $Mg^{+2}$.

The aforesaid every ion formation provides a respective $SiO_4^{4-}$ having a respective melting temperature, such as $Mg_2SiO_4$ $T_{melting}=1450°$ C., $Ca_2SiO_4$ $T_{melting}=1480°$ C., $Sr_2SiO_4$ $T_{melting}=1350°$ C., $Ba_2SiO_4$ $T_{melting}=1320°$ C.

When compared with the known prototype of the material of $Ba_3MgSi_2O_8$, the phosphor of the present invention has the feature of ecological safety. Because $Ba^{+2}$ is toxic, it must be constrained in the material. Similar to $BaSO_4$, the indissolvable $Ba^{+2}$ nitrate, chloride and bromide are ecologically dangerous. Dissolvability data of $Ba^3MgSi_2O_8$ is not available in literature. However, this compound is dissolvable in acid soil. Therefore, the concentration of $Ba^{+2}$ in the phosphor of the present invention must be reduced, and less toxic $Ca^{+2}$, $Mg^{+2}$ and $Sr^{+2}$ are used as substitutes. From this point of view, the composition of (Ba, Mg, Sr, Ca)$Si_2O_8$ has a great developed foreground. In this composition, the mass of $Ba^{+2}$ is reduced by 75% (cation lattice). From an ecological point of view, the composition of $(Ba_{0.5}Sr_{1.5}Ca_tMg_1).Si_2O_8:Eu^{+2}Sm^{+2}Mn^{+2}$, in which the content of Ba ion mass is below 12%, has a better foreground. The phosphor of the present invention is characterized in that, the material has the stoichiometric equation $(Ba_{0.5}Sr_{1.5}Ca_{1.0}Mg_{1.0})Si_2O_8$:EuSmMn, an orthorhombic architecture and the activator: $0.001 \leq Eu \leq 0.01$, $0.0001 \leq Sm \leq 0.005$, $0.005 \leq Mn \leq 0.15$, assuring blue-green-red three-band radiation in which the band relative intensity ratio is 1:2:2~1:2:4.

As stated above, this phosphor is requisite in greenhouse facility for fruit cultivation. The strong red emmission peak of the radiation $\lambda=630$ nm assures high sugar content and good taste of the cultivated crops. It is to be understood that the three-band phosphor of the present invention shows substantial benefits in multilayer greenhouse radiation where plants are intensively cultivated. The green light of the conversion spectrum is working on seedlings and plants at the lower side, assuring the desired germination rate and proper growth.

As stated above, the three-band phosphor of the present invention has high brightness of luminous energy. At this time, the rest part is sufficiently uniformly distributed in all the spectrum $\lambda=400$~800 nm. These outstanding benefits have a great concern with the inorganic three-band phosphor characterized in that: when $\alpha=2$, the material has the stoichiometric equation of $(Ba_{0.25}Sr_{1.75}Ca_{1.0}Mg_{1.0})Si_2O_8$ and an orthorhombic crystal lattice structure, activator $Eu^{+2}$, $Sm^{+2}$ and $Mn^{+2}$ of atomic fraction $0.001 \leq Eu^{+2} \leq 0.05$, $0.0004 \leq Sm^{+2} \leq 0.01$, $0.001 \leq Mn^{+2} \leq 0.05$: three-band visible spectrum in blue, green and red zones, and the band strength ratio of the three bands 2:2:3 when activated by violet light.

The substantial effect of the activator concentration in the phosphor substrate on the radiation strength of each band is described hereinafter. If the concentration of active ion $Eu^{+2}$ is $0.001<[Eu^{+2}] \leq 0.01$, the intensity of blue band radiation shows a linear relationship with the concentration of the added activator. The $Eu^{+2}$ supplement widens the spectrum bandwidth to $\lambda_{0.5}=80$ nm, enhancing the strength to 1.5~2 units. To obtain high resolution spectral characteristics, $[Mn^{+2}]$ is added to the composite at $0.001 \leq [Mn^{+2}] \leq 0.005$. Starting from this maximum value, the radiation strength of manganese ion in red spectrum is J=0.2~2.0. Red band strength extends to $0.018 \leq [Mn^{+2}] \leq 0.02$. Thereafter, the bandwidth is being widened, and the maximum value is shifted to the red zone of $\lambda=625$~638 nm.

The more complicated condition is that the radiation strength of green band $\lambda=520$ nm is determined subject to $[SM^{+2}]$ and the concentration ratio between the based ions, i.e., [Sr]/[Ba] and [Sr]/[Ca]. In the study, we emphasized the linear relationship when the concentration of the added ion was $0.0001 \leq [Sm^{+2}] \leq 0.005$. Thereafter, the substantial effect on the peak position was caused by $[Sr^{+2}]$ that was used to substitute for $[Ba^{+2}]$. When $[Sr^{+2}]/[Ba^{+2}]=4:1$, the peak strength of green band was 1.5~2 units, and no significant change was discovered when added $[Ca^{+2}]$. Following increase of this cation in the phosphor substrate, the spectrum band width of green spectrum region was increased to $\lambda_{0.5}=85$~90 nm. In order to create the proposed three-band phosphor of the invention, we studied professional synthesis techniques, including long time mixing of material, arrangement and fine compacting of prepared material in the crucible, heat treatment of material under a weak reduction air pressure and the follow-up acid-alkaline processing process and grinding in a planet-ball-grinder.

During synthesis of an inorganic phosphor in accordance with the present invention, reagents were selected from carbonate, oxalate, and hydroxylamine compound of barium, strontium, calcium and magnesium. For the reagents, the activator is preferably selected from $Eu_2O_3$ (99.99%) and $Sm_2O_3$ (99.95%). $MnCO_3$ (99.5%) can also be used. It is for sure that activator content has a great concern with the mass of the product prepared. Therefore, the content measurement error of the activator must not exceed by 5% of the mass itself. All the requisite ingredients were weighed and loaded in a professional mixer having fine zirconia grinding balls therein, and mixed for 30~120 minutes at the speed of 120~250 r.p.m.

Prepared materials were distributed in a 0.5 L or 0.75 L alundum crucible and compacted with pressure P=1 kgf/cm². The alundum crucible was then carried to a high thermal conductivity of SiC furnace and heated uniformly and rapidly at the speed of 6° C./minute. Through professional guide tubes, a gas mixture, for example, 1~5% hydrogen and 99%~95% nitrogen was added to the electric furnace. High purity gas was used during synthesis. During synthesis, gas exchange rate is 1~2 L/minute. At the initial synthesis stage, temperature was increased at the speed of 2~4° C./minute. The electric furnace was heated to the temperature about T=1100° C. for 0.5~2 hours, and then increased to the temperature range of T=1250~1400° C. for about 1~5 hours. Thereafter, the temperature of the electric furnace was dropped to T=400° C., while the assigned reduction environment was still maintained in the furnace. Thereafter, the product was removed from the crucible for further processing.

In Example I of the preparation of the three-band phosphor in accordance with the present invention, mix:

| | |
|---|---|
| $CaCO_3$: 0.3M | $SrCO_3$: 0.3M |
| $BaCO_3$: 1M | $Mg(CO)_3Mg(OH)_2$: 0.2M |
| $SiO_2$: 1M | $Eu_2O_3$: 0.005M |
| $MnCO_3$: 0.01M | $Sm_2O_3$: 0.003M |

The weighed reagents were mixed in the ceramic drum of a mixer into which 500 g of zirconia grinding balls were filled. The ceramic drum was rotated at 120 r.p.m. for two hours. Thereafter, the material was delivered to a professional alundum crucible and heated under a weak reduction environment. The material in the crucible was compacted to 1 kgf/cm². The crucible was then carried to a high thermal conductivity of SiC furnace and heated that the temperature level of T=1100° C. at the speed of 4° C./minute, and then at this temperature level for a period of $\tau=40$ minutes. The electric furnace was filled with a gas mixture $H_2:N_2=5:95$. Thereafter, the temperature of the electric furnace was increased to T=1350° C. at the speed of 4° C./minute and kept at this temperature level for 120 minutes. Thereafter, the furnace was cooled down to 200° C. while the filling of the gas mixture was continued. The product was ground in the ceramic drum of a mixer for final processing. Thereafter, the product was dissolved with 1~2% phosphoric acid solution for 8~10 minutes. The product was rinsed to a neutral PH value, and then dried in a drying cabinet at temperature T=120° C. for 180 minutes. The well-dried product was filtered through a screen of 500 meshes, and optical technical parameters and dispersability of the product were measured.

Measurement of optical technical parameters is to make sure of the relationship between the composition of the spectrum radiation and the maximum value of the spectrum, the calculation of the chromaticity coordinates and main radiation wavelength. The composition of $(Ba_{0.5}Sr_{0.15}Ca_{0.15}Mg_{0.2})_2SiO_4$ was measured to have the relationship of band ratio in the spectrum blue:green:red=1:0.5:0.5, the chromaticity coordinates x=0.2988 and y=0.3034, and the main wavelength $\lambda_d$=473 nm. The sample was measured to have the luminescence brightness B=17046 units, luminance value L>84·$10^3$. The dispersed composition of the phosphor was measured through a professional laser diffraction meter as follows:

| | |
|---|---|
| $d_{10}$ = 0.5 μm | $d_{50}$ = 0.8 μm |
| $d_{cp}$ = 1.0 μm | $d_{90}$ = 2.6 μm | average specific surface area S=44·$10^3$ cm²/cm³. There is no common viewpoint on the relative parameter of dispersed composition of phosphor for agricultural plastic film. Some industrial companies provide phosphors having an average grain size of 6≦$d_{cp}$<10 μm and a specific surface area of S≦4000 cm²/g. According to the viewpoint of the present invention, these big-sized phosphors are not practical for fabrication of thin plastic films because the grain size of d~10 μm simply matches with polymerized thin-film of concentration h=30 μm. Therefore, the production technique of the invention is to create a nanometer grade of dispersed powder, i.e., the grain size of the phosphor is reduced to the level below 1000 nm=1 μm. This nanometer grade of phosphor has the advantages of: 1. it is suitable for making a thinner film layer for agricultural plastic film; 2. it is suitable for making a thin-film layer of higher luminescence brightness; 3. it substantially improves the brightness uniformity of the luminescence film. The three-band phosphor of the present invention realizes these advantages, i.e., the three-band phosphor is a highly dispersed ultrafine nanometer grade powder having an average grain size 0.4≦$d_{cp}$≦1.0 μm, the range of specific surface area S=44·$10^3$ cm²/cm³.

The three-band phosphor prepared according to the present invention has the power surface covered with lightproof pores. When measured by BET method, the lightproof pores have the pore radius of 12 A≦$d_z$≦20 A, showing a ratio between the pore surface area and the powder surface area 1:10~2:10. The formation of these lightproof pores on the surface of the phosphor is firstly discovered that the present invention. The lightproof pores constitute important and unit parameters of the phosphor. Firstly, these lightproof pores on the surface of the phosphor improve luminescence brightness of the phosphor and provide an optical path for the radiation from the powder material toward the material surface. Secondarily, the existence of these pores improves the adherence of the phosphor to the polymeric material, thereby enhancing the mechanical tensile strength of the thin film layer. As stated above, a polyethylene-based N158 agricultural plastic film has the tensile strength of E=15 kgf/cm². This polyethylene-based N158 agricultural plastic film has filled therein non-porous phosphor. In case the polyethylene-based N158 agricultural plastic film has filled therein porous phosphor of the present invention, the tensile strength will be increased to E=30 kgf/cm². This is an important advantage of the phosphor of the present invention. The phosphor is characterized by that the ultrafine phosphor is covered with lightproof pores having the pore radius of 12 A≦$d_z$≦20 A, having the specific value between the powder surface area and the pore surface area 10:1~10:2.

As indicated above, using a light conversion agricultural plastic film raises crop productivity by 20~75%. In north hemisphere 20~40° N, under long period solar radiation and windy conditions, we made a test on a three-band agricultural plastic film and three-band phosphor prepared according to the present invention. We selected eggplant and tomato as "test samples". During a 49-day test period, the productivity of eggplant in the greenhouse was increased by 52% and the average eggplant mass per plant was 610 g compared to the eggplant mass per plant of 380 g during the same period; the productivity of tomato in the greenhouse was increased by 40% and the tomato mass per plant was increased by 5~8%.

In conclusion, the three-band phosphor for agricultural plastic film in accordance with the present invention has the characteristics of: 1. practical for making a thin-film spectral conversion material having the main spectrum at blue, green and red zones; 2. practical for making a material in the form of an inorganic phosphor for converting radiation at blue, green and red spectral regions in conformity with a predetermined strength ratio, thereby eliminating the drawbacks of conventional agricultural plastic films.

Although particular embodiments of the invention have been described in detail for purposes of illustration, various modifications and enhancements may be made without departing from the spirit and scope of the invention.

What is claimed is:

1. A three-band phosphor for agricultural plastic film, comprising a silicate-based substrate prepared from a group IIA element and activated by d-f element, wherein the three-band phosphor pertains to $(MeO)_{2\alpha}(SiO_2)_\alpha$ silicate series, in which $\alpha$=1,2,3, $\Sigma Me^{+2}=Ba^{+2}$ and/or $Sr^{+2}$ and/or $Ca^{+2}$ and/or $Mg^{+2}$, having an orthorhombic crystal architecture, and generating a three-band spectrum when activated by d-f element, the three-band phosphor having a stoichiometric equation of $(Ba_{0.5}Sr_{1.5}Ca_{1.0}Mg_{1.0})Si_2O_8$:EuSmMn, an orthorhombic crystal lattice structure, activator atomic fraction: 0.001≦Eu≦0.01, 0.0001≦Sm≦0.005 and 0.005≦Mn≦0.15, capable of having the three-band visible spectrum be within the blue-green-red zone when band strength ratio is 1:2:2~1:2:4.

* * * * *